May 26, 1970  R. W. SCHIER ET AL  3,513,986
COSTUMER WITH CHANNELED FACE
Filed June 24, 1968  2 Sheets-Sheet 1
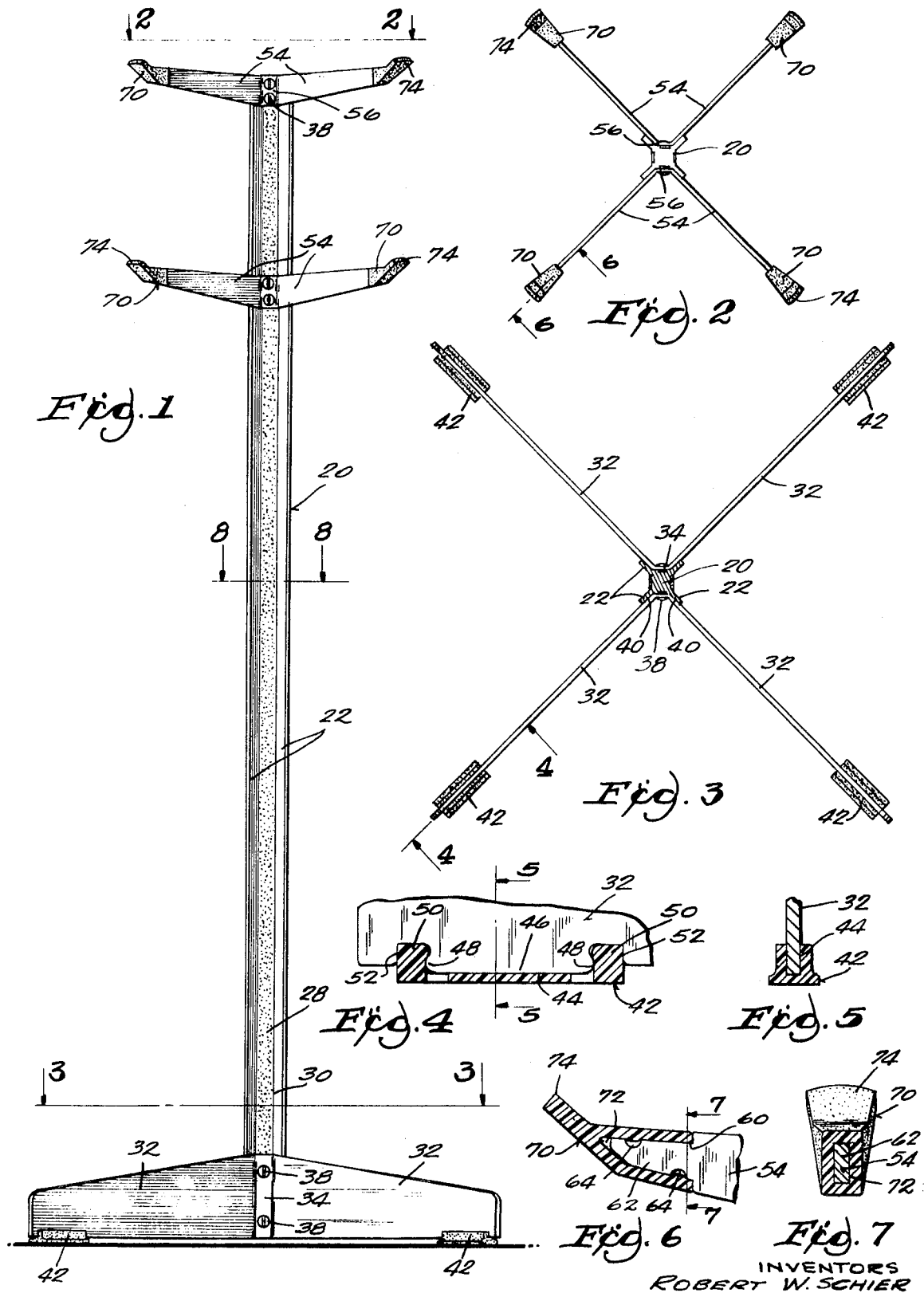
INVENTORS
ROBERT W. SCHIER
LEONARD D. SINGER
BY Wheeler, Wheeler, House & Clemency
ATTORNEYS May 26, 1970 R. W. SCHIER ET AL 3,513,986
COSTUMER WITH CHANNELED FACE
Filed June 24, 1968 2 Sheets-Sheet 2
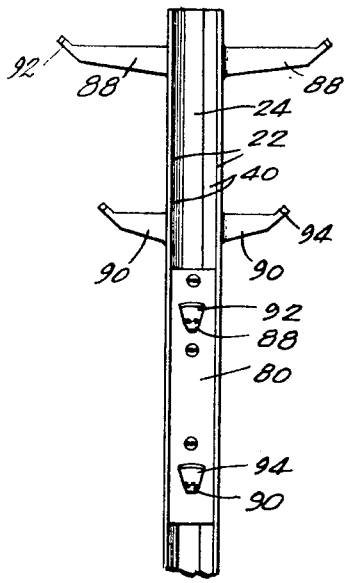
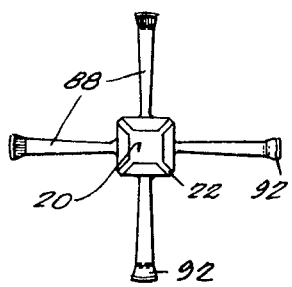
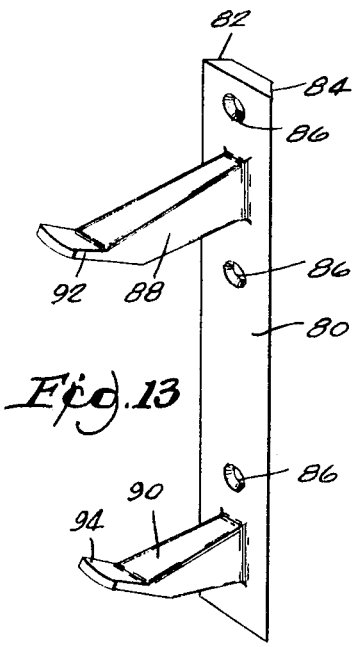
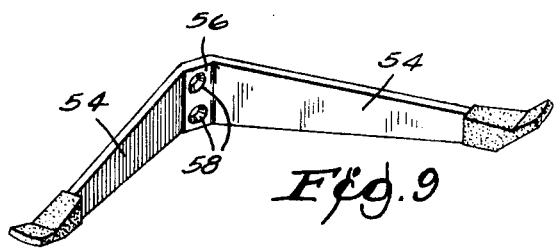
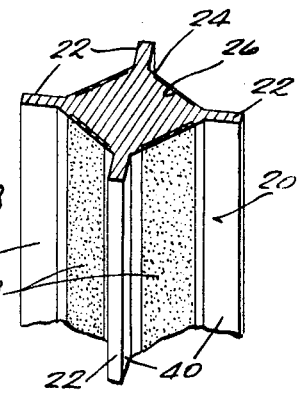
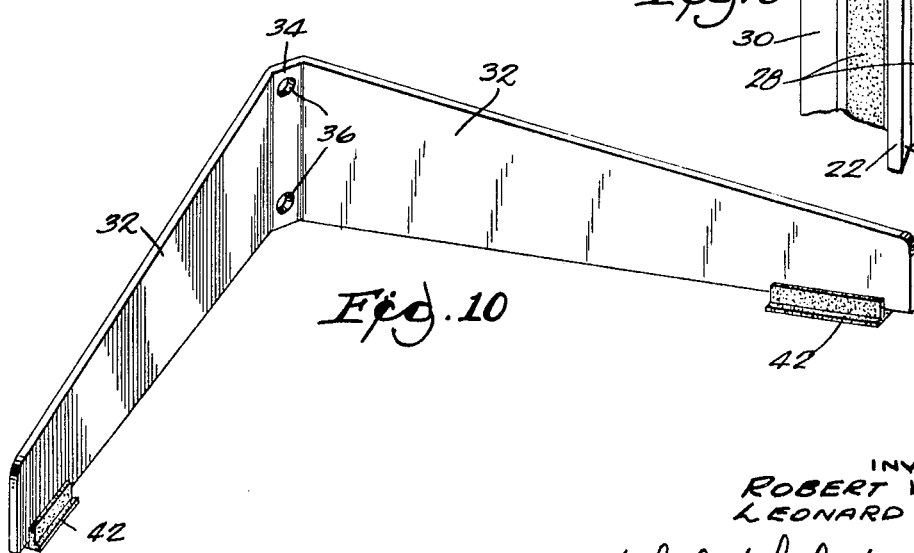
INVENTORS
ROBERT W. SCHIER
LEONARD D. SINGER
BY Wheeler, Wheeler, House & Clemency
ATTORNEYS

United States Patent Office 3,513,986
Patented May 26, 1970

1

3,513,986
COSTUMER WITH CHANNELED FACE
Robert W. Schier, Northfield, and Leonard D. Singer, Chicago, Ill., assignors to Krueger Metal Products, Inc., Green Bay, Wis., a corporation of Wisconsin
Filed June 24, 1968, Ser. No. 739,454
Int. Cl. A47f 5/04
U.S. Cl. 211—177     8 Claims

ABSTRACT OF THE DISCLOSURE

The upright post of the costumer is of generally square cross section except as provided with flanges projecting from its corners forming channels on its respective faces. Legs, and hook-supporting arms are connected at right angles to each other in oblique 45° relation to intermediate anchorage portions screwed to the post to lie within the channels and engaged laterally with the flanges of the post. Non-metallic hooks and feet are respectively interlocked mechanically with the arms and legs to require no screws.

Background of invention

Insofar as screws or the like are used for attaching the legs or arms, these serve principally to maintain the parts in connection, thrust being largely carried by mechanical engagement of the legs and arms with the post and flanges thereof. Not only is the resulting costumer very sturdy, but it can be erected conveniently in minimum time and it presents a distinctive and unusual appearance when completed.

Summary of invention

The invention hereinafter disclosed is based, first, upon the unusual form of the post. As aforesaid it is generally square in cross section except that it has flanges of substantial extent projecting diagonally from its corners.

In both embodiments of the invention, legs prefabricated in pairs are disposed obliquely with reference to an intervening mounting portion screwed to the channeled surface of the post between flanges, whereby the respective legs project outwardly along the faces of respective flanges, being supported and braced thereby. Feet near the ends of the respective legs are made of synthetic rubber molded for interlocking resilient engagement with complementary notched and tongued portions of the legs. The feet are securely fixed on the legs notwithstanding that they are readily attached and require no fastening devices of any sort.

In one embodiment, the clothes-supporting hooks are carried by arms which are mounted from the post in a manner similar to the attachment of the legs as above described. The hooks themselves are preferably non-metallic and made of a resilient, molded synthetic rubber which interlocks with notched portions of the respective arms to require no fastening devices.

In another embodiment, the mounting plate and arms and hooks are all molded integrally of a non-metallic material, the mounting plate being a strip with beveled sides and attached to the post of the costumer to lie in the channel between flanges with its sides engaged with faces of the flanges for support.

The faces of the post in the channel between flanges may be given color contrast by mounting an ornamental tape in each recess being equal in depth to the thickness of the tape so that the resulting face of the post is transversely flat for secure connection therewith of the mounting portions of the legs and bracket arms.

Brief description of drawings

FIG. 1 is a view in side elevation of a costumer embodying the invention.

FIG. 2 is a plan view thereof.

FIG. 3 is a view taken in section on the line 3—3 of FIG. 1.

FIG. 4 is a view taken in section through one of the feet on the line 4—4 of FIG. 3.

FIG. 5 is a view taken in section on the line 5—5 of FIG. 4.

FIG. 6 is a view taken in section on the line 6—6 of FIG. 2.

FIG. 7 is a view taken in section on the line 7—7 of FIG. 6.

FIG. 8 is a fragmentary detail view in perspective which includes a cross section on an enlarged scale on the line 8—8 of FIG. 1 of an intermediate portion of the post.

FIG. 9 is a detail view in perspective showing a unitarily assembled pair of arms and interviewing mounting portion for the hooks shown in FIG. 2.

FIG. 10 is a view in perspective showing unitarily assembled legs and intervening oblique mounting portion as illustrated in FIGS. 1 and 3.

FIG. 11 is a fragmentary detail view showing the upper end portion of the post of a modified embodiment.

FIG. 12 is a plan view of the embodiment of FIG. 11.

FIG. 13 is an enlarged detail view in perspective showing the unitary mounting device and hooks employed in the embodiment of FIGS. 11 and 12.

Description of preferred embodiments

The costumer post 20 is generally square in cross section. The square cross section is common to both embodiments herein disclosed. The post has a diagonal flange 22 projecting from each of its respective corners, as best shown in FIG. 8. According to the second embodiment (also shown in FIG. 8), each face 24 of the post 20 has a shallow recess at 26 in which there is supported an ornamental tape 28 which provides a color contrast with the exposed surfaces of face 24. The tape has no mechanical advantage except as a convenient means of giving the post an unusually attractive appearance. In the construction of FIG. 11, no such ornamentation is required. Accordingly, the faces 24 of the post are not recessed, the tapes 28 being omitted. In all other respects, the post of FIG. 11 is like that of FIG. 1.

At each side of the post, there is a channel 30 formed by the diagonally projecting flange 22 of the post. The bottom of the channel comprises post surfaces 24 (with the corresponding surfaces of the tape 28, if any). The invention contemplates that the legs and both styles of arms herein disclosed have means for mounting them on the post in a manner to receive support from the flanges 22.

Both embodiments of the costumer have four legs 32. In each case, the legs are prefabricated in pairs in which the legs are at right angles to each other and integrally connected by an intervening mounting portion 34 which extends obliquely at 45° between the legs and is provided with holes 36 for the mounting screws 38 which connect the prefabricated leg pair to the flanges 22 to lie within one of the channels 30. The assembly is very clearly illustrated in FIGS. 1 and 3. FIG. 3 in particular shows how the respective legs 32 are engaged with the side surfaces 40 of the respective flanges 22. The flanges tend to relieve the screws 38 of any stress other than that required to maintain the parts in connection.

Each of the legs 32 is preferably provided with a foot 42. The foot is a molded part which has a slot at 44 into which the tongue portion 46 on the lower margin of the leg 32 is extended as best shown in FIG. 4. The tongue has projections 48 at its ends. To this extent, it is slightly longer than the slot 44 into which it is received. At both sides of the slot, the foot is tightly engaged with the faces of the leg 32 as shown in FIG. 5. The end portions 50 of the foot extend into notches 52 with which the respective leg is provided beyond the projecting end 48 of the tongue 46. As clearly illustrated in FIG. 4, the end portions 50 of the foot become tightly interlocked with the leg by reason of the slight deformation of the resiliently yieldable material of the foot. This is shown clearly in FIG. 4.

In the construction of FIGS. 1 to 10, the arms 54 which provide clothes-supporting hooks of the costumer are prefabricated in pairs, being very similar to the legs 32. The arms 54 of each pair are at right angles to each other and integrally connected by a mounting portion 56 which extends at 45° between the arms and is provided with apertures at 58 with mouting screws 38 such as those holding the legs.

The arms 54 are slightly angled upwardly. As best shown in FIGS. 6 and 7, the upper and lower margins are relieved at 60 and a portion 62 of each arm beyond the shoulder thus formed tapers outwardly and has marginal notches 64. The molded hook 70 has a cavity 72 which receives the tapered extremity of the arm, the end of the molded hook seating against the shoulders formed by the relief 60. The extremity 74 of the molded hook is turned upwardly for the retention of a garmet. The molded part 70 is made of resilient synthetic material which is deformed by the insertion of the reduced extremity 62 of the arm and expands slightly into each of the recesses 64 as shown in FIG. 6. The parts are held very securely without any need of fastening devices.

The embodiment of FIGS. 11 to 13 differs from that previously desecribed only in that a different form of hook is used at the upper end, and side surfaces of the post are not recessed to receive an ornamental tape.

In this embodiment, the mounting means for the hooks comprises a somewhat elongated plate 80 which has its side surfaces 82 and 84 beveled to fit with precision into the respective channels of the post. The surfaces 82 and 84 are at right angles to each other for face contact with the corresponding side faces of the post flanges. Holes are provided at 86 for mounting screws.

The projecting arms 88 and 90 with their upturned terminal hook portions 92 and 94 are molded of the synthetic rubber or plastic material intergrally with the mounting plate 80. As will be observed, upper and lower arms in this device have a common mounting plate, whereas the embodiment first disclosed has separate mounting plates connecting the pairs of arms which serve the upper hooks and the pairs of arms which serve the lower mounting hooks. In both instances, the attaching screws which connect the mounting portion of the assembly to the costumer post are stressed primarily only to the extent needed to maintain the assembly. Lateral pressures by the flange which define the channels in which the mounting portions of the prefabricated hook assemblies are disposed.

Particularly noteworthy is the simplicity of the costumer and the ease with which it may be assembled or disassembled. In both embodiments, the legs are prefabricated in pairs with a common mounting portion and the arms are prefabricated in pairs with a common mounting portion. In each case, the prefabricated sub-assemblies have all of the non-metallic parts connected therewith by interlocking means which require no screws or other threaded connections.

We claim:

1. A costumer comprising an upright post and a plurality of sets of prefabricated legs, each such set including at least two legs at an angle to each other and an intervening mounting portion spanning the angle between the legs and connected with the post, the post having a channel with a bottom wall with which the mounting portion of each set is engaged, and side walls at an oblique angle to the bottom wall and with which the sides of respective legs are in face contact.

2. A costumer according to claim 1 in which the post is of generally rectangular cross section having sides and corners provided with flanges which project from the post at aproximately 45° to adjacent sides of the post and which, with such post sides, provide the aforesaid channels.

3. A costumer according to claim 2 in which at least one side of the post has a recess extending longitudinally of the post and a tape with a post-ornamenting surface disposed in the recess substantially flush with adjacent portions of the post side, the recess and tape being spanned by the mounting portion of one of said leg sets.

4. A costumer according to claim 1 in which each such leg has a non-metallic foot portion elongated transversely of the leg and having means interlockingly engaging it with the leg, said means comprising integral portions of respective legs and feet.

5. A costumer according to claim 4 in which each foot has a slot and each leg has notches in which the ends of a foot are received, the sides of the respective foot at opposite sides of its slot being engaged with corresponding sides of respective legs, the leg having a tongue extending into the slot and in pressure interlocking engagement with end portions of the foot.

6. A costumer comprising an upright post having legs and hooks mounted thereon and having a post portion provided with side surfaces and with corners and with flanges projecting diagonally from the corners and extending longitudinally of the post, the said flanges and side surfaces providing channels extending vertically at all sides of the post, each of said legs and hooks having means connecting it with a side surface of the post and also having means engaged with the flanges at both sides of the surface to which it is connected, the legs comprising sets which include at least two legs at an angle to each other and integrally connected with an intervening mounting portion secured to the post and disposed in one of the channels, the sides of the legs being in substantial face contact with sides of respective flanges, and set arms including prefabricated clothes-supporting arm sets each including arms and an intermediate mounting portion integrally connected therewith, the mounting portion of each said arm set being engaged in one of said channels and connected with the post and having surfaces in substantial face contact with sides of said flanges.

7. A costumer comprising a post having a channel extending up one side, said post having a surface constituting the back wall of said channel and having other surfaces and constituting side surfaces of said channel and outwardly divergent at an angle to each other spanned by said back wall, a pair of clothes-supporting arms angularly related to each other and having a common mounting means fabricated integrally therewith between said pairs of arms and in a position to span the angle between the arms of the respective pairs, and screw-threaded means for holding the mounting means to the post, said mounting means being engaged with the back wall of the channel and said arms having surfaces complementary to and abutting the side surfaces of the channel.

8. A costumer according to claim 7 in which said arms have non-metallic hook-forming elements engaged with the ends thereof and mechanically interlocked therewith.

References Cited

UNITED STATES PATENTS

| | | | |
|---|---|---|---|
| 891,029 | 6/1908 | Beach | 211—177 |
| 1,742,344 | 1/1930 | Davis | 211—182 |
| 1,875,698 | 9/1932 | Blakeslee | 211—182 |
| 3,254,362 | 6/1966 | Rasor et al. | 248—188.8 |
| 2,011,785 | 8/1935 | Vallone | 248—188.9 |
| 3,280,527 | 10/1966 | Faust. | |
| 1,423,951 | 7/1922 | Lurtz | 248—188.7 |
| 3,281,102 | 10/1966 | Hobson | 248—125 |

EDWARD C. ALLEN, Primary Examiner

U.S. Cl. X.R.

248—188.7, 188.9